US007380777B1

(12) United States Patent
Walser

(10) Patent No.: US 7,380,777 B1
(45) Date of Patent: Jun. 3, 2008

(54) ARTICULATING VISE ADAPTER (AVA)

(76) Inventor: Daniel Paul Walser, 5912 Heatherglen Ter., Fort Worth, TX (US) 76179

(*) Notice: Subject to any disclaimer, the term of this patent is extended or adjusted under 35 U.S.C. 154(b) by 152 days.

(21) Appl. No.: 11/396,867

(22) Filed: Apr. 3, 2006

(51) Int. Cl.
*B23Q 1/25* (2006.01)

(52) U.S. Cl. ............................ 269/71; 269/73; 269/79; 269/82; 269/83; 269/84; 269/85

(58) Field of Classification Search .................. 269/71, 269/73, 79, 82–85
See application file for complete search history.

(56) References Cited

U.S. PATENT DOCUMENTS

| | | | | |
|---|---|---|---|---|
| 851,491 | A | 4/1907 | Broadbooks | |
| 1,385,504 | A | 7/1921 | Stroh | |
| 1,392,130 | A | 9/1921 | Engstrom | |
| 1,423,774 | A | 7/1922 | Moore | |
| 1,507,815 | A | 9/1924 | Cumner | |
| 1,579,582 | A | 4/1926 | Voltz | |
| 1,665,170 | A | 4/1928 | Larsen | |
| 1,818,501 | A | 8/1931 | Odin | |
| 2,207,881 | A | 7/1940 | Smith | |
| 2,353,891 | A | 7/1944 | Gruntorad | |
| 2,564,566 | A * | 8/1951 | Duffy | 269/71 |
| 2,947,214 | A * | 8/1960 | Schwuttke et al. | 356/31 |
| 3,495,795 | A | 2/1970 | Brown | |
| 3,550,976 | A | 12/1970 | Rauser | |
| 4,140,307 | A | 2/1979 | Dalmau | |
| 4,378,107 | A | 3/1983 | Wagster | |
| 4,953,839 | A * | 9/1990 | Chern | 269/73 |
| 6,409,162 | B1 | 6/2002 | Belusko | |

* cited by examiner

*Primary Examiner*—Joseph J. Hail, III
*Assistant Examiner*—Shantese L McDonald
(74) *Attorney, Agent, or Firm*—Lynn Barber

(57) ABSTRACT

An articulating adapter allowing increased clamping and holding capabilities of a common vise or tool at a plurality of angles having a base mounting plate (12) attached to a table (T). The rotating plate (14) has a mounting means (24) to allow the turning on a horizontal plane while having a hinged means to the articulating plate (16) allowing movement from 0 to at least 90 degrees from horizontal. The rotating plate (14) and the articulating plate (16) are attached via a set of links (18) and a slotted link (20) and having a set on each side with a locking means (34) and (36) to set at a given plurality of angles as needed. The articulating plate (16) additionally allows a variety of sizes and types of vises or tools to be attached.

7 Claims, 6 Drawing Sheets

ARTICULATING VISE ADAPTER (AVA)

CROSS-REFERENCE TO RELATED APPLICATIONS

Not Applicable

SEQUENCE LISTING OR PROGRAM

Not Applicable

BACKGROUND OF THE INVENTION

1. Field of Invention

This invention relates to expanding the angular clamping capability of the common vise.

2. Prior Art

The common vise that is in use in most garages by home handymen and in professional use has a limitation of only being able to hold or clamp an item or tool horizontally only as wide as the jaw opening.

The only way, at this time to accomplish holding a tool or item horizontally wider than the jaws permit is to use either a very expensive machinist type of vise, which is intended for the most part, for machine shop use or using another tool or vise with the existing common vise. Also this would mean having to buy another very expensive vise and not utilizing your existing common vise.

Thus the referred to expensive vises are limited in their mounting points and are not easily mountable with the average bench or tool box where they would be typically used. Additionally the size and weight of the machine shop type vises are large, heavy and cumbersome.

The complexities of the machinist type vises are far more than the average person using it would require, such as the precision machining, the degree indicators and weight. This also increases the cost of production considerably.

There are current vises such as U.S. Pat. No. 1,507,815 to M. S. Cumner that will let the vise tilt, angle and rotate, but the complexity, cost and size are very great. Not having a variety of bolt mounting patterns precludes a limitation of mounting patterns. Another major difference is that Cumner's vice has the tilt linkages as part of the actual vise itself adding the expense of having to purchase the complete vise. Additionally the link mechanism to allow and lock into position extends beyond the mechanism and intrudes into the work space thereby again limiting working angles and interfering with its use. The number of parts to assemble this device is at least 90.

Another somewhat similar device is U.S. Pat. No. 2,353,891 to A. J. GRUNTORAD is again a very complex, expensive and bulky device. As with Cumner's, the links are also an integral part of the vise itself. Additionally it also suffers from the link mechanism extending outside the device. The number of parts to assemble this device is at least 80. As with Cumner's vice, it is also limited to the bolt pattern as to what it can be mounted to.

All of the U.S. Pat. Nos. 851,491 (1907), 1,392,130 (1921), 1,579,582 (1923), 1,665,170 (1927), 1,818,501 (1927), 2,207,881 (1938), 3,495,795 (1970) and 4,378,107 (1983) all are either complex, expensive to manufacture, bulky or are limited as to their mounting capabilities. All of the vises heretofore suffer from a number of disadvantages:

(a) the cost of manufacture is very expensive due to the highly precision machined parts;

(b) the complexity of the numerous parts makes it labor intensive to assemble adding to the cost of manufacture;

(c) the amount of material used to manufacture the vise adds to the price;

(d) the number of parts required to achieve the desired results adds to the cost of the manufacture;

(e) they are not converted easily from one size or type of vise to another;

(f) the links extend beyond the device itself interfering with the available work space;

(g) the complexity requires 80 or 90 parts; and (h) the mounting surface must have specific mounting holes and position of same to utilize all of the angular positions.

OBJECTS AND ADVANTAGES

Accordingly, several objects and advantages of the present invention are:

(a) to make the cost of manufacture very economical due to not needing all the highly precision parts;

(b) to have a minimal number of parts required for assembly to make it labor simple;

(c) to make the amount of material used as small as possible thereby reducing cost of manufacture;

(d) the number of parts required to accomplish the same result are minimal;

(e) the mounting pattern allows for fitment of a variety of sizes and types of common vises and tools without modification;

(f) the link system does not extend beyond the device increasing the available usable work space;

(g) the AVA has only 33 individual parts in the preferred embodiment;

(h) the AVA not only can accommodate a wide variety of vices or tools, it could accommodate the Gruntorad and Cumner type of vises;

(i) the vises of the previous mention could not accommodate the common vise and keep the same capabilities; and (j) the AVA is an adapter and not a vise in and of itself.

Further objects and advantages are to provide an adapter not only to compliment the average vise but to make it a much more usable clamping and holding device, thereby adding to the capabilities in a plurality of angles.

Additionally, the simplicity of use as well as the minimal number of parts make it economical to manufacture, allowing increased safety, using a single device to minimizing possible injury, to accomplish ergonomic positioning of the item, material or tool being used thereby allowing increased productivity.

Still further objects and advantages will become apparent from a consideration of the ensuing description and drawings.

SUMMARY

In accordance with the preferred embodiment of the present invention an adapter that comprises three plates and a series of positional links that allow a plurality of angles and rotatable positions to allow the common vise to be utilized in said positions.

DRAWINGS

Figures

In the drawings, made from the actual working prototype; the articulating vise adapter is referred to as AVA.

REFERENCE NUMERALS

| | |
|---|---|
| 10 articulating vise adapter (AVA) | 12 base mounting plate |
| 14 rotating plate | 16 articulating plate |
| 18 link | 20 slotted link |
| 22 base mounting bolt | 23 front mounting bolt |
| 24 counter sunk bolt | 26 rotating plate locking bolt |
| 28 spacer | 30 linkage mounting bolt |
| 31 hinge pin mounting bolt | 34 link locking bolt |
| 36 link locking nut | 38 attachment bolt |
| 39 slot | 40 drilled hole |
| 41 threaded hole | 42 spacer |
| 44 rotation locking bolt | |

DETAILED DESCRIPTION OF THE PREFERRED EMBODIMENT

The articulating vise adapter of the invention herein allows a vise or tool to be positioned securely at a plurality of angles from horizontal to vertical from 0 to at least 90 degrees while allowing rotational positioning horizontally to at least 90 degrees allowing much more versatility and usability in a safe manner.

Thus, the adapter of the invention will allow the common vise, through the use of the preferably three plates of the adapter, to be positioned at a multitude of angles. The mounting plate is secured to a flat surface or table and has a center pivot point and a curved slot to allow the rotating plate to move in the horizontal plane via the pivot point at least 90 degrees, secured in position via a bolt through the slot in the mounting plate and through the rotating plate. The rotating and articulating plates are hinged together on one edge. The hinged sides of the rotating and articulating plates, through a set of movable, lockable links attached to the sides opposite the rotating and articulating plates hinge, allow the movement of the articulating plate from 0 to at least 90 degrees from horizontal and secured at a desired angle by the lockable links. The articulating plate has a variable bolt mounting pattern to accommodate the fitment of various sizes of a vise or tool.

A preferred embodiment of the adapter of the present invention is illustrated in FIGS. 1 through 12. All parts of an adapter 10 are made of hardened materials such as steel, aluminum, cast, forged metals or other hardened materials dependent on the intended use and strength required for the application desired. As used herein, the term "locking means" includes the locking bolts and nuts disclosed herein and the term "mounting means" includes the mounting bolt disclosed herein.

Figure 1:
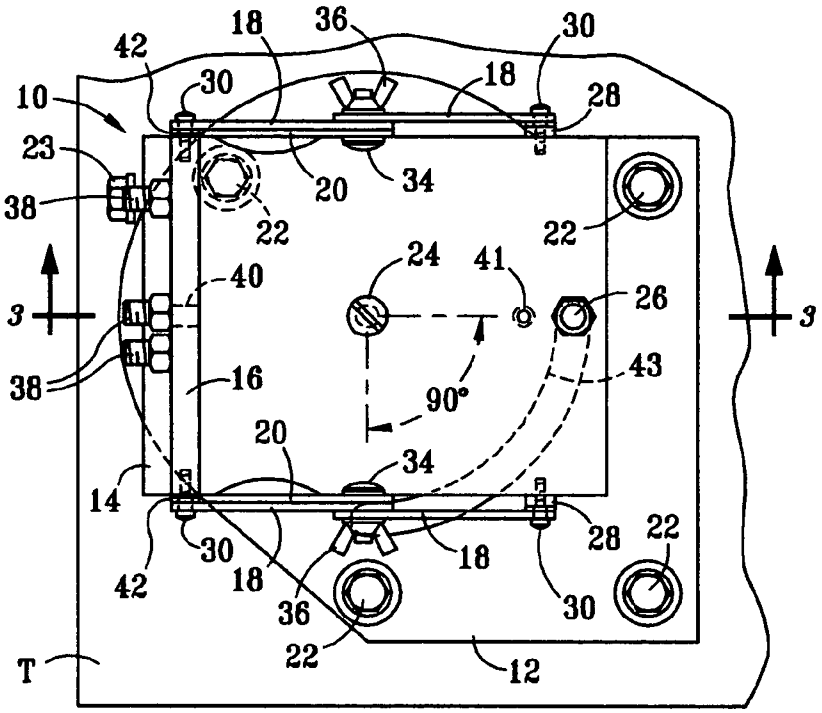
FIG. 1 shows a top view with the articulating plate in the vertical position.

Referring now to the Figures, FIG. 1 (top view) shows an adapter 10 in the extended vertical position. Adapter 10 is mounted to surface T with base mounting bolts 22. The rotating plate 14 is shown whereby a counter sunk bolt 24 allowing rotating plate 14 to move to a given point from 0 to 90 degrees, more if the application requires. Rotation plate locking bolt 26 secures rotating plate 14 to a desired position through slotted channel 43.

Figure 2:
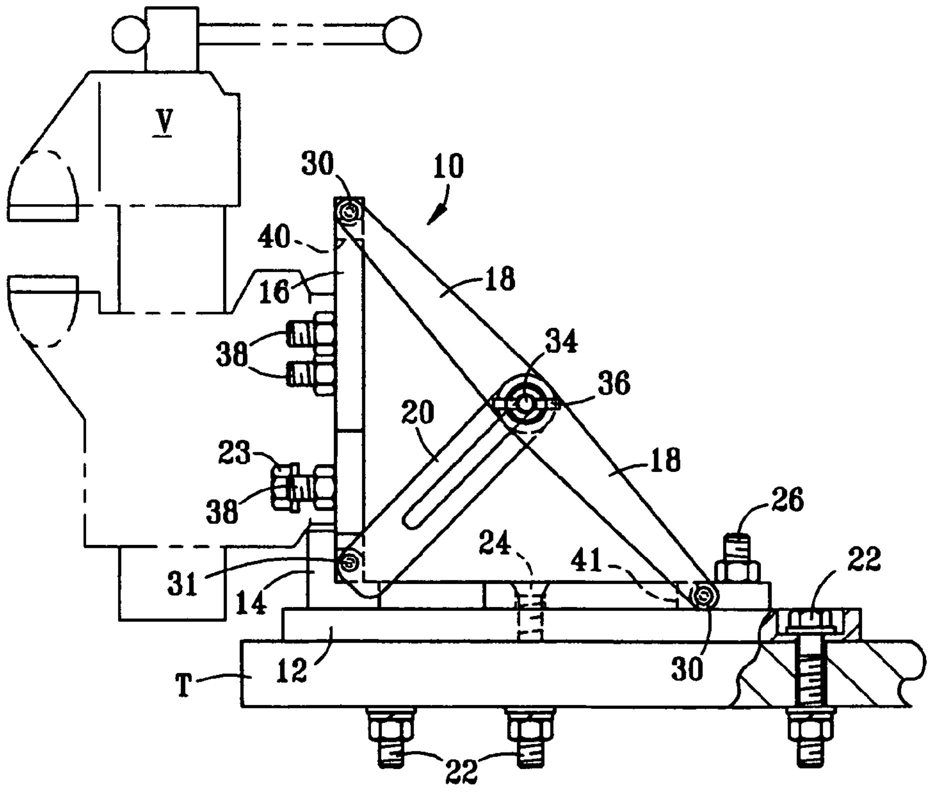
FIG. 2 shows a side view at a 90 degree angle with a vise attached.

FIG. 2 (side view) shows a common vise V mounted to adapter 10 in the vertical position. Articulating plate 16 is hinged with a pin 31 of material strengthened to accommodate the needs of the application through rotating plate 14 allowing articulating plate 16 to move through 0 to 90 degrees from the horizontal position, more if the application requires it. Linkage mounting bolts 30 secure links 18 to articulating plate 16 and rotating plate 14.

Figure 3:
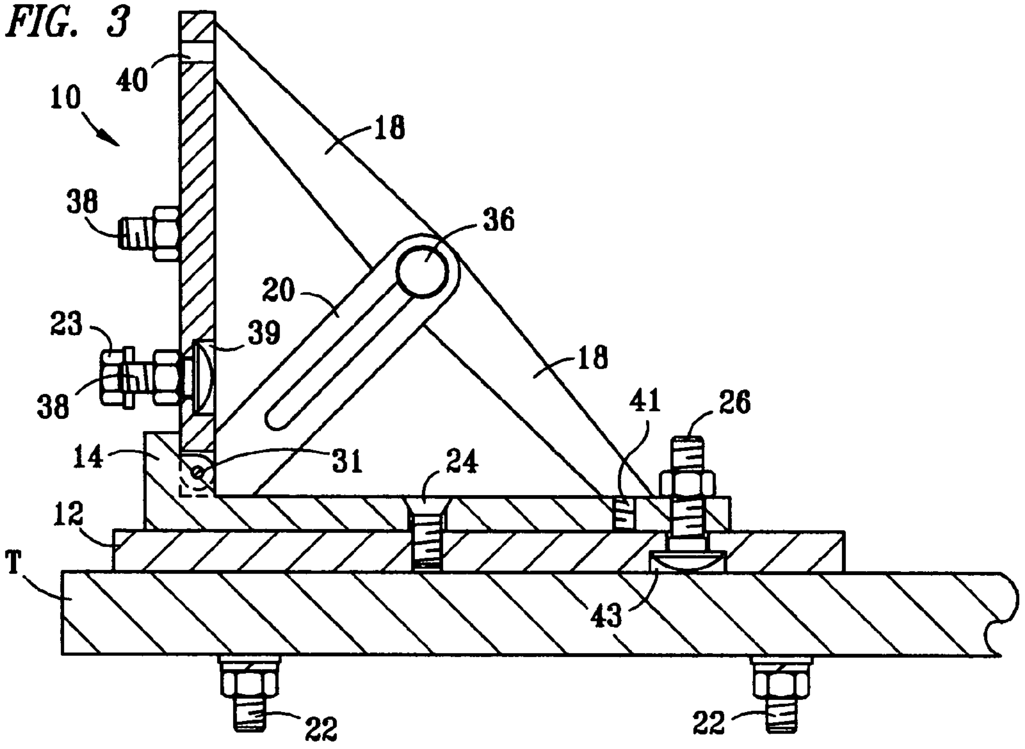
FIG. 3 shows a 90 degree side view cutaway.

FIG. 3 (side cutaway view) shows links 18 and slotted link 20 at their relative position at the 90 degree vertical position.

Figure 4:
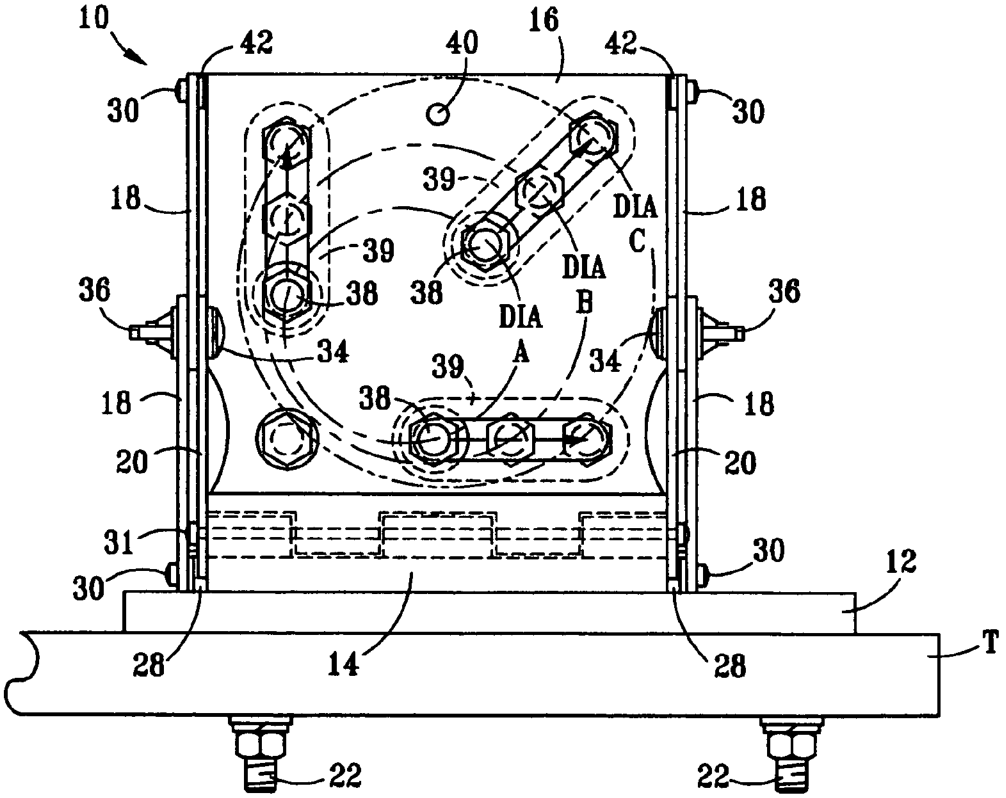
FIG. 4 shows a vertical front view.

FIG. 4 (front view) is shown with articulating plate 16 in the front vertical position. Attachment bolts 38 are adjustable in movement along slots 39 to accommodate various bolt patterns. In addition, link locking bolts 34 and locking nuts 36 secure articulating plate 16 and rotating plate 14 at a plurality of angles. Spacers 42 and 28 are of a width to allow articulating plate 16 to move from vertical to a horizontal position. Hinge pin 31 can be clearly seen.

Figure 5:
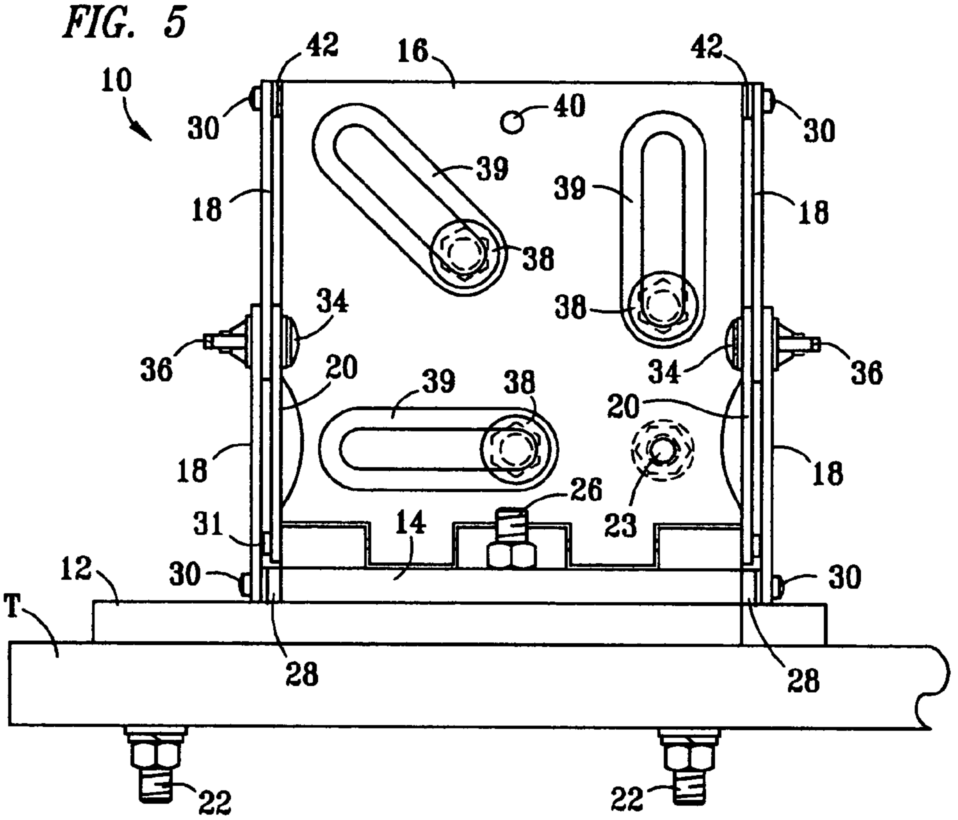
FIG. 5 shows a back view of FIG. 4.

FIG. 5 (bottom view) of articulating plate 16 shows one embodiment of the hinge design of articulating plate 16 and rotating plate 14 although any method that provides the flexibility and strength, such as more individual interlocking tabs on the plates, but is not limited to these. Optional mounting bolt 23 is for some vises that have four base mounting holes.

Figure 6:
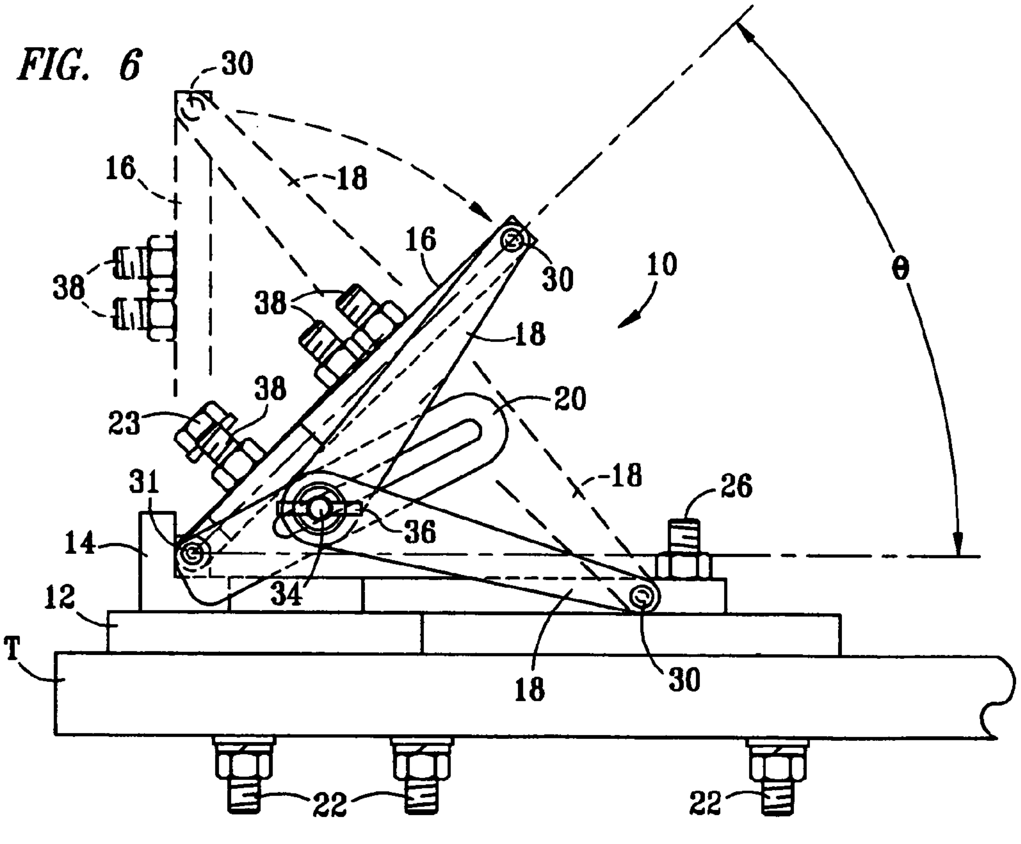
FIG. 6 shows a side view at a 45 degree angle.

FIG. 6 (side view) shows articulating plate 16 in one of many possible positions. Pivotably and slideability of links 18 and slotted link 20 can be readily seen.

Figure 7:
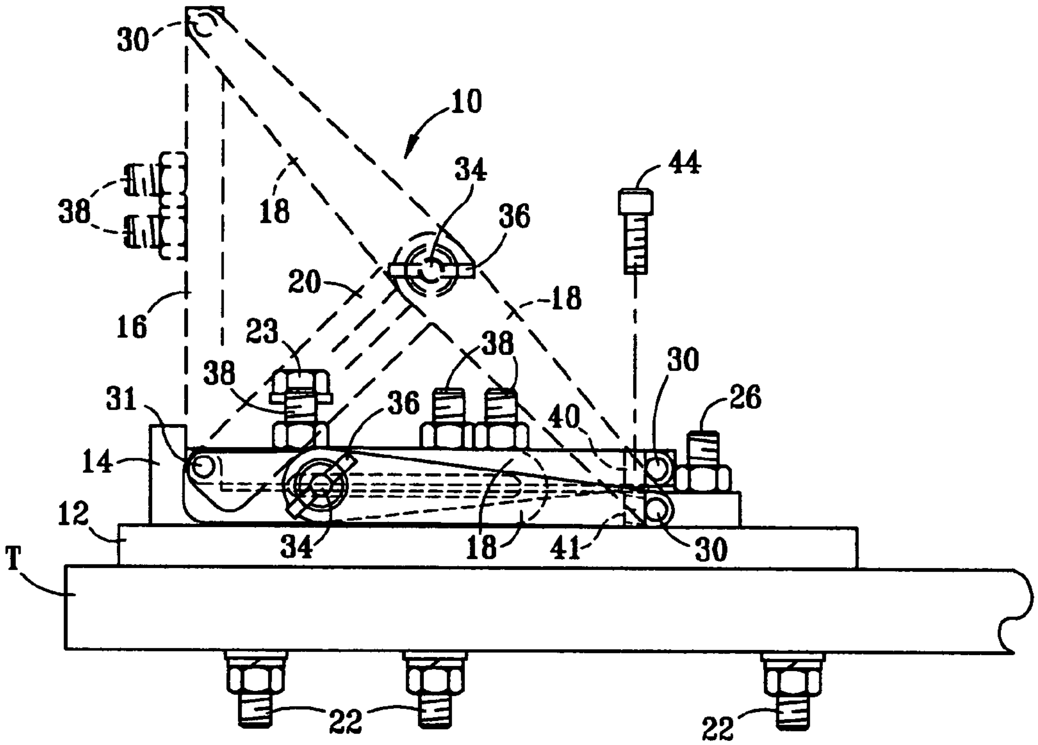
FIG. 7 shows a side view in the horizontal position.

FIG. 7 (side view) shows adapter 10 in the horizontal position. Hole 40 allows articulating locking bolt 44 to go through articulating plate 16 into a threaded hole 41 to lock articulating plate 16 into a secure horizontal position.

Figure 8:
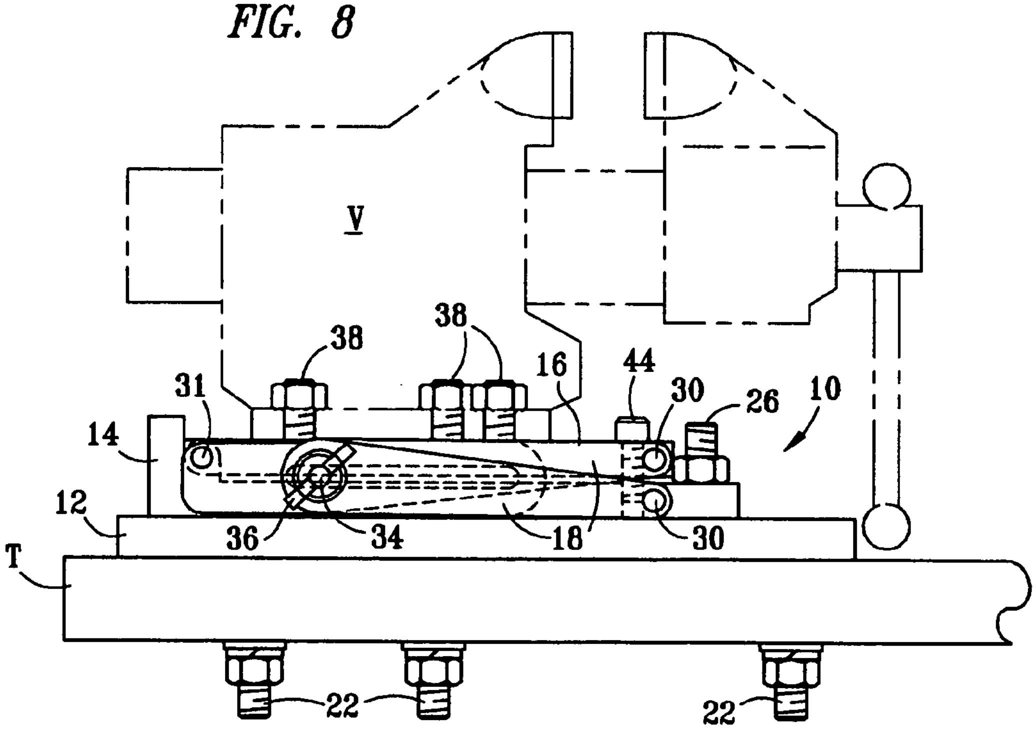
FIG. 8 shows a side view with a vise mounted in the horizontal position.

FIG. 8 (side view) shows adapter 10 in the relationship of vise V in the horizontal position. Articulating plate locking bolt 44 is shown in the secured position.

Figure 9:
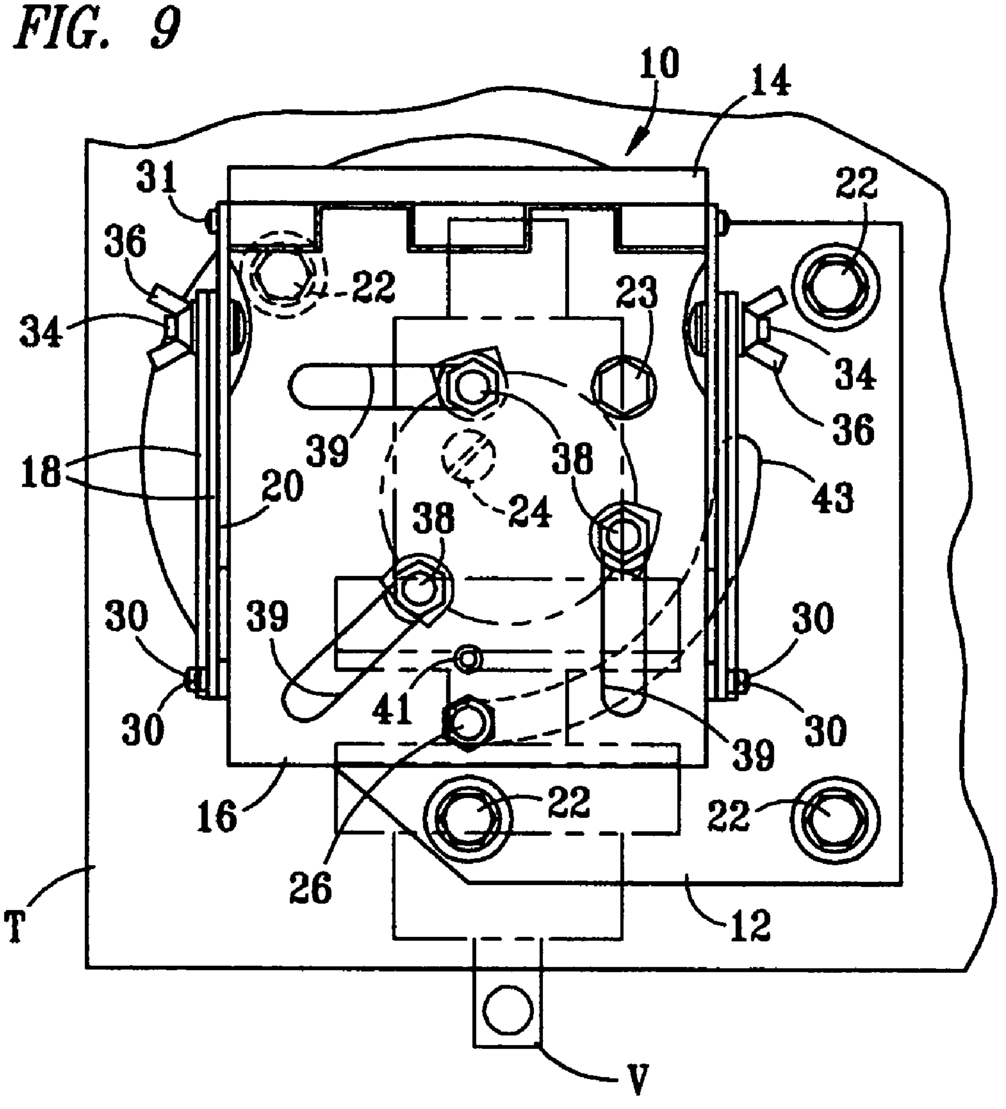
FIG. 9 shows a top view with a vise attached in the horizontal position.

FIG. 9 (top view) shows vise V mounted to adapter 10 in the horizontal position, displaying the versatility of movement with the sandwiching of the links evident.

Figure 10:
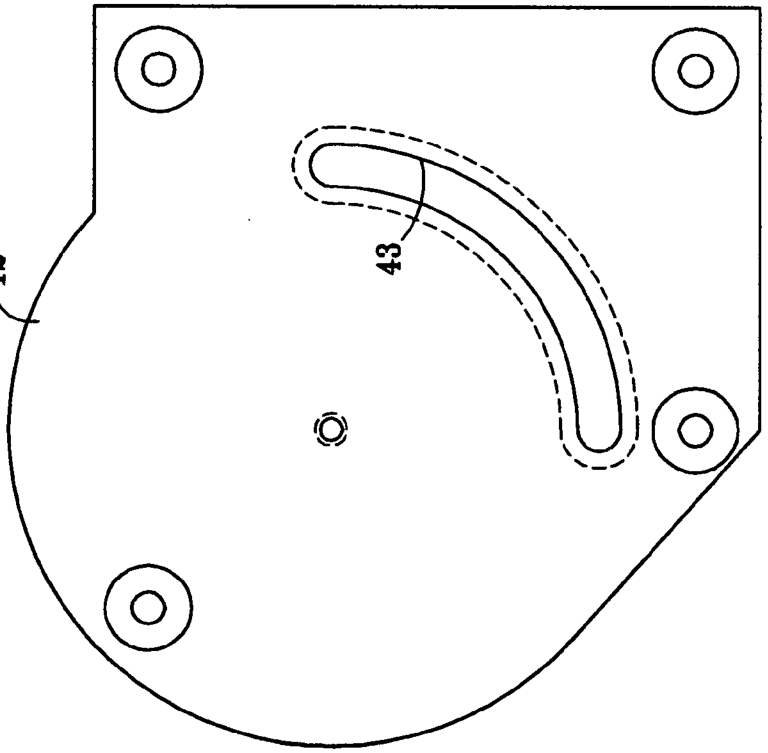
FIG. 10 shows the top side of the mounting plate.

FIG. 10 (top view) shows base mounting plate 12 and rotational slot 43 allowing rotating plate 14 to move through at least 90 degrees.

Figure 11:
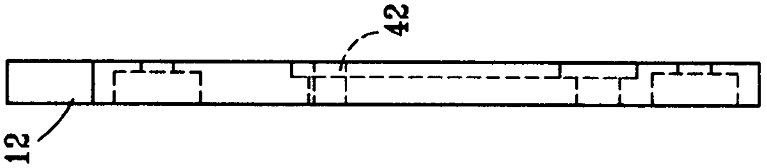
FIG. 11 shows a side view of the mounting plate.

FIG. 11 (side view) shows base mounting plate 12.

Figure 12:
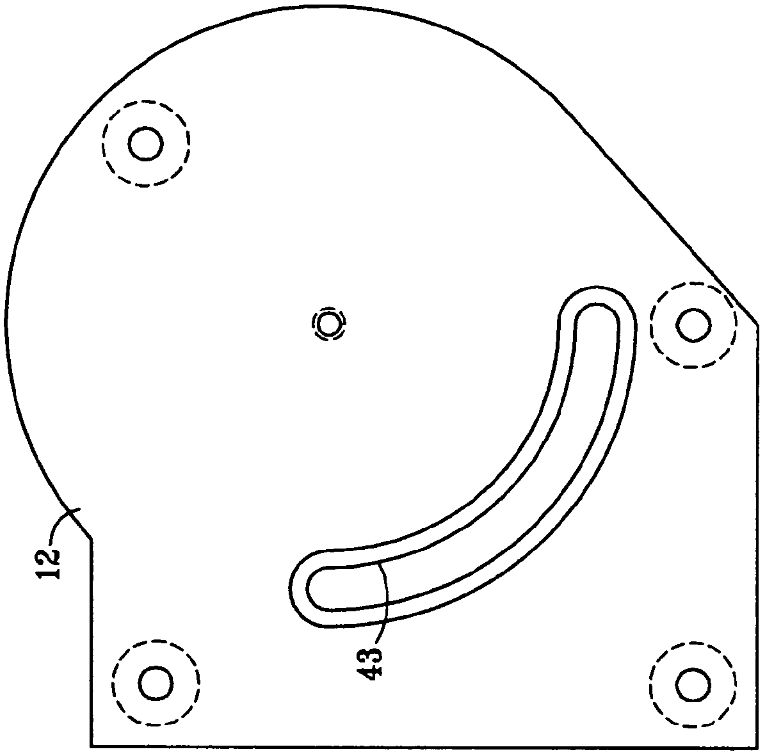
FIG. 12 shows a bottom view of the mounting plate.

FIG. 12 (bottom view) again shows base mounting plate 12 and slotted channel 43 allowing rotating plate 14 to move through at least 90 degrees.

The reader can clearly see how the combination of the above description and the drawings of the present preferred embodiment of the articulating vise adapter make it a novel and unobvious invention.

ALTERNATIVE EMBODIMENTS

The materials used can be made thicker or of a type needed for the application such as stainless steel, carbon fiber, or other composite material. Also, the links that support the adapter at a secure angle as required can be thickened, lengthened or an additional number as needed can be added to provide the needed support. Additionally the hinge portion can be strengthened as well by increasing the number of hinge tabs as needed and the rotating plate can be easily, with minor modifications, moved up to 360 degrees with minor changes to the base mounting plate; giving way to different mounting patterns as needed in various sizes to accommodate both large and small requirements.

Advantages

From the description above, a number of advantages of my articulating vise adapter become evident:

(a) the costs to produce the articulating vise adapter are considerably less;
(b) the minimal number of parts required makes production labor simple;
(c) the small amount of material required to manufacture reduces the cost considerably;
(d) the number of parts is minimal to accomplish the same functions;
(e) the mounting versatility allows a range of attaching a vise or tool considerably wide in scope;
(f) the compact design with the links that do not extend outside during use allowing more workable space;
(g) the device of the invention has only about 33 parts;
(h) the adaptor of the invention could even accommodate the vises of Gruntorad or Cumner;
(j) the articulating vise adapter is an adapter and not a vise.

CONCLUSION, RAMIFICATIONS, AND SCOPE

Accordingly the reader will see that the articulating vise adapter can be used to increase the versatility of a common vise or tool beyond its normal range of usage, allowing a wide range of sizes and types of vises or tools in a plurality of angles, creating a more ergonomically comfortable work environment, thereby increasing the safety of the work environment thus decreasing the possible injuries and increasing production, the adapter has the additional advantages in that:

it permits a common vise or tool to be used in a plurality of angles;
it permits ease of producing due to the small number of parts;
it permits a low cost of manufacture due to the minimal amount of material;
it permits a common vise or tool to function as the more complex vises with a minimal number of parts;
it permits fitment of a wide variety of vises and tools of various sizes;
it permits the use of more workspace as the links do not extend outside the adapter;
it permits the ease of using due to it having only about 33 parts;
it permits the use of a vise or tool to be used without difficulty;
it permits ergonomic placement of item;
it permits even the vises of Gruntorad or Cumner to be mounted;
it increases the safety of use;
it is not a vise but it is an adapter.

Although the description above is one embodiment, it should not be construed as limiting the scope of the invention but as merely providing an illustration of the presently preferred embodiment of this invention. For example, the adapter could be different sizes, made of different materials, have different mounting means, different links of different materials, different hinge types and or different locking means.

While the preferred embodiment that is discussed and shown herein has three linked plates, for certain limited purposes, it may be sufficient to have only two of the plates herein, particularly if the surface on which the adapter is to be mounted can be structurally modified to serve the same function as the mounting plate of the invention, for example, by incorporating the mounting surface into the adapter.

Thus the scope of this invention should be determined by the appended claims and their legal equivalents rather than by the examples given.

I claim:

1. An adapter for holding a vise or tool comprising a plurality of plates comprising a rotating plate, an articulating plate having a bolt pattern to accommodate attachment of various sizes of vise or tool, and a base mounting plate having a center pivot point and a curved slot to allow the rotating plate to move horizontally around the pivot point, and locking means comprising movable, lockable links attached to edges of the rotating and articulating plates, wherein the rotating and articulating plates are hinged together on edges opposite the lockable links, so that the articulating plate with attached vise or tool can be angled at from 0 to 90 degrees from horizontal and locked at a desired angle with the lockable links, and the rotating plate and attached articulating plate with attached vise or tool can be rotated via the center pivot point in a plurality of angles and locked with a bolt through the slot to allow the attached vise or tool to be placed in a stable position at a plurality of angles and to hold or clamp an item or tool at a plurality of angles in a stable position.

2. The adapter of claim 1 wherein the adapter can be angled from a horizontal position to a plurality of angles up to 90 degrees with locking means for locking the vise or tool in a stable position.

3. The adapter of claim 1 wherein said vise or said tool attached to the adapter can be rotated to a plurality of positions with locking means in a stable position.

4. The adapter of claim 1 wherein the attached vise or tool may be angled and rotated in any combination or plurality of angles.

5. The adapter of claim 1 wherein said vise or said tool is mountable by mounting means that are variable to allow various sizes of vises or tools to be mounted on the adapter.

6. The adapter of claim 1, wherein the adapter is made of a metallic or strengthened type of material.

7. A method of expanding the holding and clamping capabilities of a vise or tool, comprising:

(a) providing the adapter of claim 1;
(b) mounting the vise or tool to said adapter;
(c) positioning said adapter to allow said vise or said tool to be used in a position selected from the group consisting of:
  (i) a horizontal position;
  (ii) a position at any angle from 0 to 90 degrees;
  (iii) a rotated position while being at any angular position; and
  (iv) a secured position in any combination of angle and rotation, whereby said adapter can be used with a variety of mounting patterns.

* * * * *